US012633752B1

(12) United States Patent
Li

(10) Patent No.: US 12,633,752 B1
(45) Date of Patent: May 19, 2026

(54) DISTRIBUTED ENERGY RESOURCE SYSTEM

(71) Applicant: Apollo Investments, LLC, Los Angeles, CA (US)

(72) Inventor: Wen Li, El Segundo, CA (US)

(73) Assignee: Apollo Investments, LLC, Los Angeles, CA (US)

( * ) Notice: Subject to any disclaimer, the term of this patent is extended or adjusted under 35 U.S.C. 154(b) by 0 days.

(21) Appl. No.: 19/402,787

(22) Filed: Nov. 26, 2025

Related U.S. Application Data

(60) Provisional application No. 63/898,199, filed on Oct. 13, 2025.

(51) Int. Cl.
  *H02J 3/38* (2026.01)
  *B60L 53/53* (2019.01)
  *H02J 3/32* (2006.01)

(52) U.S. Cl.
  CPC ................ *H02J 3/38* (2013.01); *B60L 53/53* (2019.02); *H02J 3/32* (2013.01)

(58) Field of Classification Search
  CPC ....................................................... H02J 3/38
  See application file for complete search history.

(56) References Cited

U.S. PATENT DOCUMENTS

| | | | |
|---|---|---|---|
| 12,322,976 | B2 | 6/2025 | Moorman |
| 2003/0008183 | A1 | 1/2003 | Hsu |

| | | | |
|---|---|---|---|
| 2005/0200205 | A1* | 9/2005 | Winn ........................ H02J 9/08 |
| | | | 307/64 |
| 2016/0320107 | A1 | 11/2016 | McKay |
| 2023/0402636 | A1 | 12/2023 | Allinson et al. |
| 2024/0097444 | A1 | 3/2024 | Ou et al. |
| 2024/0372370 | A1 | 11/2024 | Kikkawa |
| 2025/0167553 | A1 | 5/2025 | Gan et al. |

OTHER PUBLICATIONS

International Search Report and Written Opinion mailed Feb. 25, 2026 in PCT/US25/59491.

* cited by examiner

*Primary Examiner* — Daniel Kessie
(74) *Attorney, Agent, or Firm* — Enable IP, P.C.

(57) ABSTRACT

An advanced hybrid distributed energy resource (AHDER) system is disclosed. The AHDER includes a fuel power generator system (FPGS) configured to utilize alternative fuel to produce electricity, a main control center (MCC) configured to serve as a central hub of the AHDER system for managing and optimizing power generation and distribution; a battery energy storage system (BESS) configured to store excess energy and provide power; a fast-charging system (FCS) configured to receive AC power from the MCC and convert the AC power to DC power for charging equipment; an emission control subsystem (ECS) configured to reduce pollutants emitted by the FPGS; a combined heat and power (CHP) system configured to recover waste heat from an emission from the FPGS for generating electricity and thermal energy; and a $CO_2$ capture system configured to receive thermal energy from the CHP system and treat exhaust from the ECS for producing liquid $CO_2$.

20 Claims, 8 Drawing Sheets

400

401

Vehicle 1: SOC 20%,
Depart 30 min

402

Vehicle 2: SOC 60%,
Depart 2 hr

404

Priority: High

406

Priority: Low

407

AI Balancer

408

Allocate: Port 1 = 500 kW,
Port 2 = 200 kW

410

Total = 700 kW < 10 MW

OK

DISTRIBUTED ENERGY RESOURCE SYSTEM

CROSS-REFERENCE TO RELATED APPLICATION

This application claims priority to U.S. Provisional Patent Application No. 63/898,199, filed on Oct. 13, 2025, the entire contents of which are incorporated herein by reference.

FIELD

This invention relates generally to distributed energy resource systems, and more particularly to a hybrid, modular, near-zero-emission power generation and distribution system utilizing alternative hydrocarbon-based fuels, integrated energy storage, fast-charging infrastructure, emissions control, and thermal energy recovery for grid-tied and off-grid applications.

BACKGROUND

The global transition toward electrification, particularly in heavy-duty transportation, industrial operations, and remote infrastructure, has placed unprecedented strain on existing electrical grids. The rapid adoption of electric vehicles (EVs), especially heavy-duty electric trucks at ports, airports, and logistics hubs, demands megawatt-scale charging capacity that often exceeds local grid capabilities, leading to voltage instability, brownouts, and costly infrastructure upgrades.

Moreover, the explosive growth of AI-driven data centers is driving global electricity demand greatly increasing, with individual hyperscale facilities requiring 300~1,000 MW of continuous baseload power that existing grids cannot deliver, resulting in multi-year interconnection queues, outright moratoriums, and threats of widespread voltage collapse. Unlike intermittent renewables or slow grid upgrades, data centers demand immediate, 24/7/365 ultra-reliable clean power at scale with greater than 99.999% uptime.

Traditional distributed energy resources (DERs), such as solar photovoltaic arrays and wind turbines, are inherently intermittent and require vast land areas and large-scale battery storage to ensure reliability. These systems are ill-suited for high-density, high-power applications or locations with limited space or inconsistent renewable resources.

In remote or underdeveloped regions, construction, mining, and agricultural operations rely on diesel generators, which are costly, logistically challenging, and emit significant pollutants including, for example, nitrogen oxides ($NO_x$), sulfur oxides ($SO_x$), carbon monoxide (CO), and volatile organic compounds (VOCs), and carbon dioxide ($CO_2$).

Meanwhile, alternative hydrocarbon-based fuels, such as natural gas (NG) and renewable natural gas (RNG) represent abundant, dispatchable, lower-carbon fuel sources. However, conventional gas-fired generators suffer from thermal inefficiency (typically 30-40% electrical efficiency) and require extensive post-treatment to meet modern air quality standards, particularly in non-attainment zones.

The following is exemplary prior art in the field.

U.S. Pat. No. 12,322,976 B2 (the '976 patent), entitled "Controller for a Portable Microgrid System and Methods of Use," describes a controller for a portable microgrid system that integrates a fuel-based generator, battery storage, solar arrays, and power electronics to manage power distribution for mobile applications like EV charging and load balancing, optimizing for cost, energy, and carbon intensity via networked decision-making. However, the disclosed system lacks dedicated emissions control subsystems such as $NO_x$ reduction via selective catalytic reduction or $CO_2$ capture for monetization and carbon credits. Additionally, the '976 patent emphasizes intermittent renewables like solar alongside fuel generators without waste heat recovery for enhanced efficiency. The fast-charging is not megawatt-scale DC-focused that is designed for heavy-duty equipment. The system of the '976 patent also does not include bidirectional thermal energy transfer to support $CO_2$ sequestration.

US Patent Application Publication No. 2024/0097444 A1 (the '444 application), entitled "Hybrid System and Method for Distributed Virtual Power Plants Integrated with Intelligent Net Zero Carbon Management," outlines a hybrid system for virtual power plants (VPPs) that aggregates distributed resources like renewables and storage for carbon-aware power dispatch, incorporating AI-driven carbon pricing agents (CPAs), emission management platforms, and trading mechanisms to minimize net-zero carbon footprints through behind-the-meter load allocation and economic optimization. However, the system of the '444 application is not a physical, modular hardware-centric system. It lacks an on-site alternative fuel generator (e.g., RNG/NG engines), dedicated $NO_x$ and $CO_2$ capture hardware, and CHP for thermal efficiency. Rather, it focuses on software-mediated VPP orchestration across disparate plants without hardware-level emissions treatment or fast-charging infrastructure. The system of the '444 application prioritizes virtual aggregation and carbon trading analytics, but lacking integrated energy storage system to power grid synchronization and waste heat utilization.

US Patent Application Publication No. 2025/0167553 A1 (the '553 application), entitled "Shared Energy Storage System Optimization Method and System for Comprehensive Energy Microgrids," discloses an optimization method for shared energy storage in microgrids, integrating CHP units, gas turbines, power-to-gas (P2G) conversion, and carbon capture and storage (CCS) models to balance multi-energy flows (electric, heat, gas) using Mixed-Integer Linear Programming (MILP) algorithms that account for carbon capture, economic pricing constraints, and efficiency under variable loads. The system of the '553 patent focuses on algorithmic optimization of shared storage across regional microgrids but is silent regarding dispatchable hydrocarbon generation, megawatt DC fast-charging for heavy-duty EVs, and $NO_x$-specific controls. There is no disclosure in the "533 application regarding real-time power routing and black-start capabilities that prioritizes near-zero emissions via integrated hardware subsystems and off-grid autonomy without reliance on broader grid-sharing economics.

SUMMARY

The invention discloses an Advanced Hybrid Distributed Energy Resource (AHDER) system engineered to generate, store, distribute, and manage clean electric power with near-zero emission using alternative fuels including natural gas (NG), renewable natural gas (RNG), methane, ethane, propane, and other hydrocarbon-based fuels.

In some embodiments, the system includes a Fuel Power Generator System (FPGS) as a primary dispatchable power source, a Main Control Center (MCC) for centralizing power and a data management hub, a Fast-Charging System (FCS) with high-power DC output for charging EV trucks and electric equipment, a Battery Energy Storage System (BESS) as an energy buffer and a grid stabilizer, a Emission Control System (ECS) for post-combustion emissions treatment, a Combined Heat and Power (CHP) System for waste heat recovery and secondary power generation, $CO_2$ Capture System (CCS) for carbon separation, purification, and liquefaction Embodiments of the AHDER system can integrate up to seven modular subsystems under centralized intelligent control to achieve high electrical and thermal efficiency, ultra-low emissions, such as $NO_x$, $CO_2$ capture and monetization, megawatt-scale DC fast charging for heavy-duty EVs, grid stabilization and peak shaving via BESS, bidirectional grid interaction (V2G/G2V), off-grid autonomy in remote environments.

Embodiments of the present disclosure fulfill this need through the Advanced Hybrid Distributed Energy Resource (AHDER) system.

In one embodiment, an advanced hybrid distributed energy resource (AHDER) system is disclosed. The AHDER system includes a fuel power generator system (FPGS) configured to utilize alternative fuel to produce electricity; a main control center (MCC) electrically coupled to the FPGS and an electric power grid, the MCC configured to import power from and export power to the electric power grid; a battery energy storage system (BESS) electrically coupled to the MCC and configured to store excess energy and provide electric power; a fast-charging system (FCS) electrically coupled to the MCC and configured to receive AC power from the MCC and convert the AC power to DC power for charging electric equipment; an emission control subsystem (ECS) fluidly coupled to an exhaust outlet of the FPGS and configured to reduce pollutants emitted by the FPGS; a combined heat and power (CHP) system electrically coupled to the MCC and thermally and electrically coupled to the ECS, the CHP system configured to recover waste heat from the emission of the FPGS for generating electricity and thermal energy; and a $CO_2$ capture system configured to receive thermal energy from the CHP system and treat exhaust from the ECS for producing liquid $CO_2$. The FPGS, MCC, BESS, FCS, ECS, CHP, and $CO_2$ capture system are each a sub-system of the AHDER system.

In one embodiment, the FPGS includes one or more reciprocating engines or microturbines with fuel-flexible intake capable of switching between at least two types of hydrocarbon-based fuels.

In one embodiment, the MCC includes an energy management system (EMS) configured to provide real-time optimization of fuel consumption, a state-of-charge of the BESS, thermal energy distribution, and charging demand of the AHDER.

In one embodiment, the EMS is configured to select an operation mode of the AHDER system from a plurality of operation modes including: a) Normal Mode, in which the EMS simultaneously dispatching the FPGS, the CHP, and the BESS while importing power from and exporting power to the electric power grid; b) Peak Shaving Mode, in which the EMS discharges the BESS within its 80%~90% state of charge (SOC) to cap grid import below Time-of-Use (TOU) thresholds; c) Off-Grid Mode, in which the EMS isolates the AHDER from the electric power grid and sustains fast-charging and $CO_2$ capture using only the FPGS, the CHP, and the BESS; d) Fast-Charge Priority Mode, in which the EMS allocates at least 90% of available power to the FCS while curtailing non-essential loads; e) Black Start Mode, in which the EMS initializes the FPGS using the BESS without using power from the electric power grid; f) $CO_2$ Maximization Mode, in which the EMS diverts 100% of thermal output from the CHP system to the $CO_2$ Capture System for high pressure or liquid $CO_2$ production; g) Export Maximization Mode, in which the EMS ramps the FPGS and CHP system power exporting to the electric power grid; h) General-Purpose Outlet Mode, in which the MCC provides remaining power to the power outlet for non-essential loads curtailed; and i) Maintenance Mode, in which the EMS reduces load of the AHDER system to 20% while cycling one or more of the FPGS, the ECS, the CHP system, the $CO_2$ Capture System, the BESS, and the FCS for safe servicing.

In one embodiment, when in the Normal Mode, the EMS automatically balances, within ±0.1% in real time, P_supply=P_generator+P_CHP+P_BESS_out+P_grid against P_charging+P_sub+P_export+P_BESS_in within ±0.1% in real time, wherein P_supply is an overall power supply of the AHDER system, P_generator is a power output of the FPGS, P_CHP is a power output of the CHP system, P_BESS_out is a power output of the BESS, P_grid is a power output of the electric power grid, P_charging is an amount of power consumed by electric equipment charging from the FCS, P_sub is an amount of the total amount of power consumed by the operation of all sub-systems, and P_export is an amount of power exported to the electric power grid and the power outlet, P_BESS_in is the power charged back to BESS system.

In one embodiment, when in the Peak Shaving Mode, the EMS executes a pre-programmed 15-minute forecast to discharge the BESS within its 80%~90% SOC.

In one embodiment, when in the Off-Grid Mode, the EMS sheds non-critical loads within 50 ms while sustaining both fast-charging provided by the FCS and $CO_2$ capturing by the $CO_2$ capture system.

In one embodiment, when in the Fast-Charge Priority Mode, the EMS dynamically limits $CO_2$ capture parasitic load to redirect power to the FCS for simultaneous charging of a plurality of electric equipment.

In one embodiment, when in the Black Start Mode, the EMS uses the BESS to spin the FPGS from 0 to 1 MW in less than 90 seconds.

In one embodiment, when in the $CO_2$ Maximization Mode, the EMS opens a thermal valve to 100% to boost $CO_2$ regeneration and yield $CO_2$ products.

In one embodiment, when in the Export Maximization Mode, the EMS synchronizes the FPGS and the CHP to deliver maximum power to the electric power grid.

In one embodiment, when in the Maintenance Mode, the EMS reduces fuel flow to the FPGS to 20%, cycles selective catalytic reduction (SCR) catalyst heaters of the ECS, and logs all temperatures for predictive analytics.

In one embodiment, the FCS is configured to deliver 0.5~1,000 MW of DC power at 400-1500 V and support a plurality of charging protocols; and the FCS is further configured to perform ground fault detection and emergency shutdown.

In one embodiment, the BESS has a capacity of 0.5~2,000 MWh and is configured to perform peak shaving, frequency regulation, synthetic inertia, and black start capability, with a cycle life of 3000~6,000 cycles or more at 80% depth of discharge.

In one embodiment, the ECS is configured to employ selective catalytic reduction (SCR) with urea or ammonia injection to reduce $NO_x$ level to 2~9 ppm or less.

In one embodiment, the ECS includes oxidation catalysts for reducing $SO_x$, CO, VOCs, or particulate matter.

In one embodiment, the CHP system is configured to recover waste heat from an exhaust and jacket water of the FPGS to generate electricity and supply thermal energy to the $CO_2$ capture system.

In one embodiment, the CHP system is configured to generate the electricity via an Organic Rankine Cycle (ORC) or steam turbine.

In one embodiment, the $CO_2$ capture system uses amine-based chemical absorption to capture greater than 90% of $CO_2$, with regeneration driven by thermal energy from the CHP subsystem, producing liquid $CO_2$ with greater than 99.9% purity.

In one embodiment, the alternative fuel includes one of hydrocarbon-based fuels such as natural gas, renewable natural gas, methane, ethane, propane, and syngas.

DETAILED DESCRIPTION OF THE PREFERRED EMBODIMENTS

In the following description of preferred embodiments, reference is made to the accompanying drawings which form a part hereof, and in which it is shown by way of illustration specific embodiments, which can be practiced. It is to be understood that other embodiments can be used, and structural changes can be made without departing from the scope of the embodiments of this disclosure.

Figure 1:
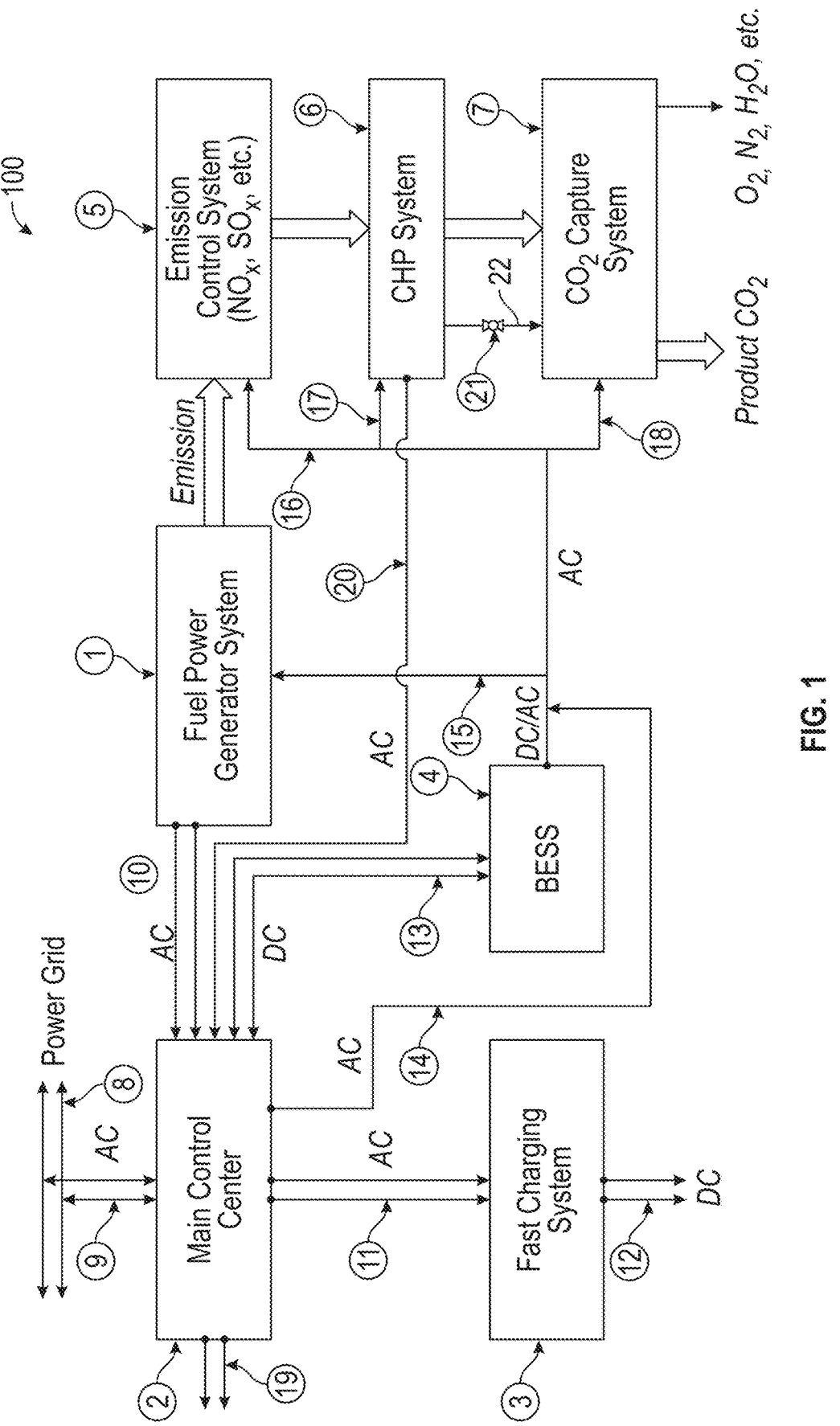
FIG. 1 is a system-level schematic diagram illustrating the exemplary components of an advanced hybrid distributed energy resource (AHDER) system including interconnections between subsystems and power, thermal and emission flows, according to an embodiment of the disclosure.

FIG. 1 is a system-level schematic diagram of an advanced hybrid distributed energy resource (AHDER) system illustrating interconnections among its subsystems and how power, thermal and emission flows in the microgrid of the AHDER system.

In the illustrated embodiment, the Fuel Power Generator System (FPGS) 1 in the AHDER system 100 utilizes renewable natural gas (RNG) and natural gas (NG) to produce reliable electric power. The FPGS 1 is also referred to hereinafter as an "alternative fuel generator." The power output by the FPGS 1 is transferred to the Main Control Center (MCC) 2. The emission from the FPGS 1 is first transfer to the Emission Control System (ECS) 5. The ECS 5 can be a $NO_x$ reduction system in certain embodiments.

The MCC 2 is the power management system for the whole AHDER system 100. The MCC 2 serves as the central hub for managing and optimizing power generation and distribution. It can intelligently coordinate the operation of other subsystems of the AHDER system 100, such as the alternative fuel generator, ECS 5, CHP 6, $CO_2$ capture system 7, battery energy storage system (BESS) 4, fast-charging system (FCS) 3 and power outlet 19, to provide efficient energy flow and system stability. By monitoring real-time data, the MCC 2 can balance load demands, integrate grid-tied or off-grid configurations, and enhance reliability while minimizing emissions.

It can have functions including, but not limited:

Convert and transfer power from/to a power grid 8 to which the AHDER system is connected;

Provide AC power to the FCS 3;

Convert and transfer power from/to the BESS 4;

Covert and transfer power from the CHP System 6;

Transfer the thermal energy from the CHP system 6 to the $CO_2$ Capture System 7; and Provide AC power assisted by the BESS 4 to power the FPGS 1, the ECS 5, the CHP 6, and the $CO_2$ Capture System 7.

The FCS 3 can provide DC power to charge electric equipment, such as electric vehicles. In some embodiments, the FCS 3 can enable rapid and efficient charging of electric vehicles and other electric devices powered by batteries. As discussed in detail below, the FCS 3 can integrate seamlessly with the power grid 8, BESS 4, and alternative fuel generator 1 to deliver high-power output with minimal energy loss. Designed for reliability, the FCS 3 can support both grid-tied and off-grid operations, ensuring accessibility in diverse environments. The FCS 3 can also prioritize safety and compatibility, adhering to modern charging standards while reducing environmental impact through optimized energy use.

The BESS 4 can function as a "power bank" to absorb power from the power grid 8 and/or the FPGS 1. The BESS 4 stores excess energy generated from alternative fuel sources, such as renewable natural gas and natural gas, for use during peak demand or grid outages. It can enhance system reliability by providing a stable power supply in both grid-tied and off-grid configurations. The BESS 4 also supports fast-charging applications and optimizes energy efficiency, contributing to the system's near-zero-emission goals through intelligent energy management.

The ECS 5 can reduce $NO_x$ or, if necessary, other pollutants such as $SO_x$, etc., emitted by the FPGS 1 to meet environmental requirements. The ECS 5 is designed to minimize nitrogen oxide ($NO_x$) emissions produced by FPGS 1 during the combustion of alternative fuels such as natural gas and renewable natural gas. Employing advanced technologies such as selective catalytic reduction (SCR) or low-$NO_x$ burners, it can effectively reduce harmful pollutants to meet stringent air quality regulations.

The CHP 6 utilizes the waste heat from the emission of the FPGS 1 and increases the overall energy efficiency of the AHDER system 100. The CHP 6 can generate electric power and recover thermal energy from the waste heat produced during electricity generation, which would otherwise be lost, and use it for heating, cooling, or other industrial processes. The majority of the recovered thermal energy can be used by the $CO_2$ capture system 7.

The CO$_2$ Capture System 7 can capture the CO$_2$ emitted by the FPGS 1, to produce industrial level CO$_2$ products that can be sold and used for generating carbon credits.

The power grid 8, which can be external to the AHDER system 100, is connected to the AHDER system 100 through the MCC 2. The power grid and the MCC 2 are connected by a bi-directional high voltage electric cable 9. The high voltage electric cable 9 can transfer power from the power grid 8 to the MCC 2. Additionally, the high voltage electric cable 9 can also transfer power generated by the FPGS 1 and/or CHP 6 through the MCC 2 to the Power Grid 8.

The FPGS 1 is connected to the MCC 2 via high voltage electric cable 10. The high voltage electric cable 10 transfers AC power from the FPGS 1 to the MCC 2.

The MCC2 and FCS 3 are connected by a high voltage electric cable 11. The high voltage electric cable 11 provides AC power from the MCC 2 to the FCS 3.

One or more electric cables 12 can provide DC power from the FCS 3 to one or more electric equipment (e.g., electric vehicles).

The MCC 2 and the BESS 4 are connected by a bi-directly high voltage electric cable 13. The bi-direction high voltage electric cable 13 transfers DC power between the MCC 2 and the BESS 4.

The MCC 2 and the BESS 4 are also connected by electric cable 14. The electric cable 14 can provide AC power from the MCC 2 assisted by the BESS 4 for powering one or more of the FPGS 1, the ECS 5, the CHP 6, and the CO$_2$ Capture System 7 on an as-needed basis.

The MCC 2 assisted by the BESS 4 provides AC power via electric cable 15 to the FPGS 1.

The MCC 2 assisted by the BESS 4 provides AC power via electric cable 16 to the ECS 5.

The MCC 2 assisted by the BESS 4 provides AC power via electric cable 17 to the CHP 6.

The MCC 2 assisted by the BESS 4 provides AC power via electric cable 18 to the CO$_2$ Capture System 7.

Optionally, the MCC 2 can have a power outlet 19 for providing AC power for usages other than charging electric equipment.

The AC power generated from the waste heat from the emission of the FPGS 1 can be transferred via the CHP 6 and power cable 20 to the MCC 2. This can further improve the overall energy efficiency of the AHDER system 100.

Thermal energy recovered from the waste heat generated from the FPGS 1 can be output from the CHP 6 via insulated line 22 controlled by a thermal valve 21 to the CO$_2$ Capture System 7 to be utilized by the CO$_2$ Capture System 7 to further improve overall energy efficiency of the AHDER system 100.

Table 1 below provides the inter-subsystem connections of the AHDER system 100 of FIG. 1.

These inter-subsystem connections in the AHDER system 100, as depicted in FIG. 1, form a highly integrated, bidirectional network of electrical, thermal, and exhaust pathways orchestrated by the MCC 2 to ensure seamless power management, emissions mitigation, and revenue-generating CO$_2$ utilization.

During operation, high-voltage AC power from the FPGS 1 flows via electric cable 10 to the MCC 2. The MCC 2 then converts and distributes the converted power in one or more of the following ways: 1) bidirectionally to the power grid 8 through electric cable 9 for export/import; 2) as HV AC via electric cable 11 to the FCS 3 for 1-5 MW delivery to connected electric equipment (e.g., EVs) through electric cable(s) 12; 3) bidirectionally with the BESS 4 via electric cable 13 for storage/peak support; and 4) as auxiliary AC via electric cable 15, 16, 17, 18 to power internal loads of the AHDER system 100 including the FPGS 1, ECS 5, CHP 6, and CO$_2$ Capture 7.

Exhaust from FPGS 1 is routed first to the ECS 5 for emission reduction, then to the CHP 6. The CHP recovers thermal energy and outputs it via line 22 (controlled by a thermal valve 21) to be used for both driving zero-parasitic CO$_2$ regeneration in the CO$_2$ Capture System 7 and generating secondary AC power returned via electric cable 20 to the MCC 2, thereby enabling greater than 90% CO$_2$ capture and liquefaction into salable liquid product and achieving high overall energy efficiency up to 70%~85%. Additional outlets of the MCC 2 provide MCC-sourced AC via electric cable 19 for external loads and grid-stabilizing vehicle-to-grid (V2G) flows, creating a closed-loop emissions-to-revenue pathway absent in prior art.

The following paragraphs provide additional details of the components and workflows of each of the main subsystems of the AHDER system 1 of FIG. 1

Fuel Power Generator System

Figure 2:
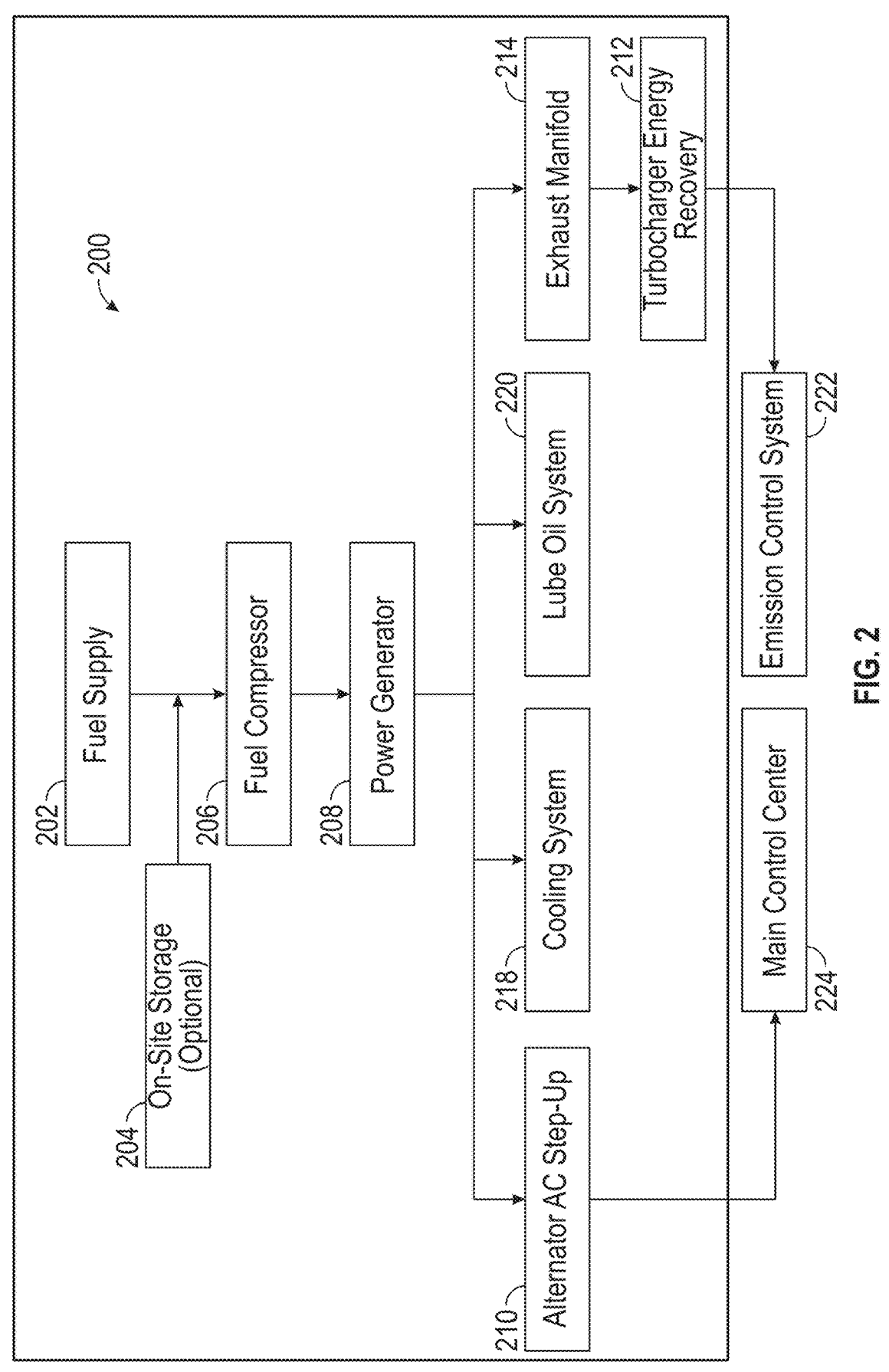
FIG. 2 is a schematic diagram illustrating the exemplary components of the Fuel Power Generator System of the AHDER system of FIG. 1, according to an embodiment of the disclosure.

FIG. 2 is a schematic diagram illustrating the exemplary components of the FPGS 1 of FIG. 1. The Fuel Power Generator System 200 forms the core power generation backbone of the AHDER system, utilizing lean-burn reciprocating engines to deliver AC power at a high electrical efficiency from a daily fuel of renewable natural gas (RNG) with natural gas (NG) backup or other hydrocarbon-based fuels. Fuel is supplied via a fuel pipeline 202. An optional fuel storage tank 204 for emergency use may be incorporated, if needed. The fuel from the fuel pipeline 202 is compressed by the fuel compressor 206 to engine pressure before entering the power generator 208.

The generator 208 can drive one or more low-voltage alternators 210, stepped up to a high voltage and fed to the Main Control Center 224 (i.e., MCC 2 of FIG. 1) via electric cable 10 (shown in FIG. 1) at the local grid frequency.

TABLE 1

| Label | Connection | Type | Description |
|---|---|---|---|
| 9 | Power Grid ↔ MCC | HV AC | Bidirectional power transfer |
| 10 | FPGS ↔ MCC | HV AC | Primary power input |
| 11 | MCC ↔ FCS | HV AC | Charging power delivery |
| 12 | FCS ↔ EV | HV DC | Vehicle interface |
| 13 | MCC ↔ BESS | HV DC | Bidirectional energy flow |
| 14 | MCC ↔ Auxiliary Loads | LV DC/AC | Powers internal subsystems |
| 15-#18 | MCC ↔ FPGS/ECS/CHP/CO$_2$ | LV AC | Auxiliary power supply |
| 19 | MCC ↔ External AC Loads | LV AC | General-purpose outlet |
| 20 | CHP ↔ MCC | MV AC | Secondary electricity |
| 22 | CHP ↔ CO$_2$ System | Thermal | Waste heat transfer (hot water/steam) |

The power generator 208 can also produce 400-500° C. exhaust to be routed through the exhaust manifold 214 and turbocharger(s) 212 to the Emission Control System 222 (i.e., ECS 5 in FIG. 1).

The turbocharger 212 consumes a small fraction (~5%) of the exhaust energy to compress intake air, slightly improving overall efficiency.

Cooling system 218 can reject ~50% of waste heat from the power generator 208 to the atmosphere via radiators or cooling towers.

About 3~8% of the gross electrical output to be consumed internally by parasitic loads such as cooling system 218, lube oil system 220 and auxiliary systems (fuel booster compressors, pumps, fans, controls, etc.).

The FPGS 200 is the primary power generation module of the AHDER system. It includes one or more reciprocating internal combustion engines or microturbines (i.e., power generator) optimized for operation on natural gas, renewable natural gas, or blended hydrocarbon fuels. In the various embodiments of the disclosure, the FPGS can run on NG, RNG, landfill gas, propane, ethane, synthetic gas (syngas), or other hydrocarbon-based fuels via automated fuel switching. The FPGS can have a power output of 100 kW to 10 MW per unit (scalable in 100 kW increments) and beyond. The FPGS can achieve an exemplary electrical efficiency of 42-48% Lower Heating Value (LHV) at full load. The FPGS can include combustion control, either stoichiometric or lean-burn with pre-chamber ignition and real-time λ control. The exhaust outlet of the FPGS can be directed to the ECS (e.g., $NO_x$ control system) and the CHP of the AHDER system.

Main Control Center

Figure 3:
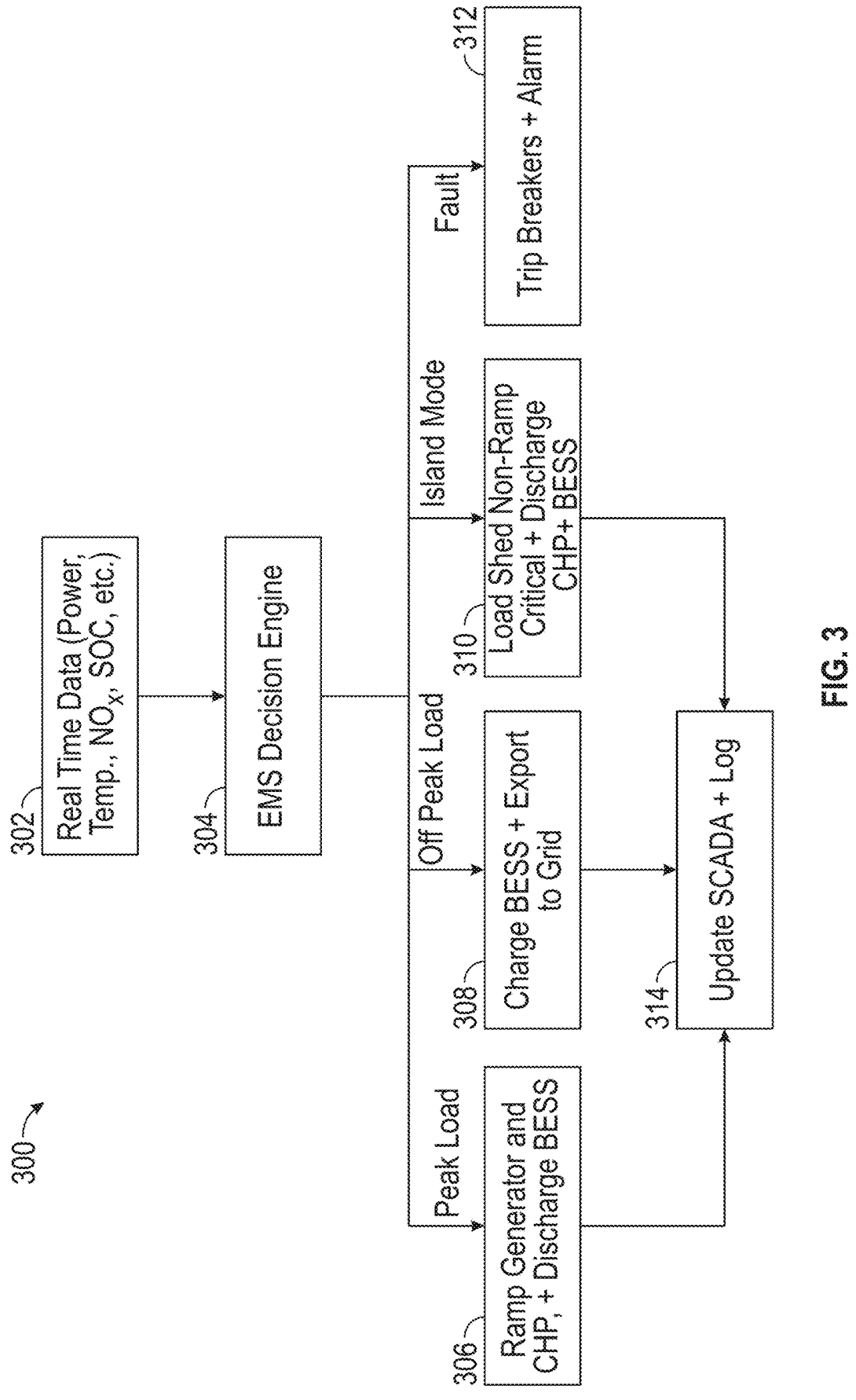
FIG. 3 illustrates a control logic example of the Main Control Center of the AHDER system of FIG. 1, according to an embodiment of the disclosure.

FIG. 3 illustrates an exemplary control logic of the MCC 2 of the AHDER system 100 of FIG. 1. The MCC 300 in this embodiment employs a hierarchical, AI-augmented control logic flow that continuously ingests real-time data 302 such as power output of the AHDER system, BESS state-of-charge (SOC), charging demand from the battery electric equipment (e.g., electric vehicles, ground support equipment), grid signals, and emissions from all subsystems via Modbus Transmission Control Protocol (TCP), IEC 61850, and DNP3 (Distributed Network Protocol 3) protocols or other up-to-date control protocols.

A master PLC (Programmable Logic Controller) of the EMS decision engine 304 can execute a 1-ms scan cycle, while an embedded AI load forecaster can predict, for example, demand 15 minutes ahead to optimize energy dispatch.

The Energy Management System (EMS) decision engine 304 can make decisions based on the different operational modes. For example, during peak demand 306, the EMS 304 can prioritize BESS discharge and generator ramp-up to shave peaks. During off-peak periods 308, the EMS 304 can charge the BESS from excess generation and export power to the power grid for arbitrage. When in the island mode 310, the EMS 304 can shed non-critical loads and sustain essential battery electric equipment charging for a desired period based on the capacity of BESS and its discharging rate. Fault conditions 312 can trigger instantaneous breaker trips via Generic Object-Oriented Substation Event (GOOSE) messaging, with all decisions logged in a 30-day historian and visualized on a Supervisory Control and Data Acquisition (SCADA) human machine interface (HMI) 314, ensuring 99.99% uptime, North American Electric Reliability Corporation (NERC) Critical Infrastructure Protection (CIP) compliance, and seamless integration of the AHDER's 75% efficient hybrid architecture.

In one embodiment, the MCC can be implemented using the following components: 1) a power conversion layer including AC/DC rectifiers (grid↔DC bus), DC/DC converters (BESS↔charging↔internal loads), and DC/AC inverters (generator↔grid↔auxiliary loads); 2) a control layer including PLC-based SCADA with predictive load forecasting, IEC 61850/DNP3/Modbus TCP communication, and Cybersecurity per NIST SP 800-82; and 3) energy management functions including real-time optimization of fuel use, BESS SOC, and charging demand Peak shaving, valley filling, frequency regulation, and Black start capability.

Fast Charging System

Figure 4:
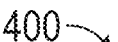
FIG. 4 illustrates an exemplary dynamic load sharing logic of the fast-charging system of the AHDER system of FIG. 1, according to an embodiment of the disclosure.

FIG. 4 illustrates an exemplary dynamic load sharing logic of the fast-charging system (FCS) 3 of the AHDER system 1 of FIG. 1 with multi-port DC outputs. The dynamic load sharing logic of the FCS 400 can intelligently allocate the available 10 MW DC power across up to, for example, 20 ports using an AI-enhanced controller that prioritizes electric equipment (e.g., electric vehicles) based on state-of-charge (SOC) and/or departure urgency.

For example, when Vehicle 1 (SOC 20%, departing in 30 minutes) 401 and Vehicle 2 (SOC 60%, departing in 2 hours) 402 are both connected to the FSC 400, the FSC 400 can classify Vehicle 1 as HIGH priority 404 and Vehicle 2 as LOW priority 406. The AI balancer 407 of the fast-charging system 400 can then assign 500 kW to Port 1 (to which Vehicle 1 is connected) and 200 kW to Port 2 (to which Vehicle 2 is connected) 408, ensuring the HIGH priority Vehicle 1 404 is fully charged on time while maintaining total demand below the 10 MW limit 410. This real-time optimization, which can be executed in 100 ms cycles via Open Charge Point Protocol (OCPP) 2.0.1 and ISO 15118 Plug & Charge, can maximize fleet uptime, prevent grid overload, and support 24/7 operations with zero downtime.

In some embodiments, the FCS 400 can deliver various power levels for DC fast charging via multiple CCS1, MCS, or NACS ports. The FCS 400 can have, for example, an output voltage in the range of 400~1500 VDC (dynamic), a current at up to 3000 A per port (liquid-cooled cables), an efficiency greater than 98% (SiC-based power electronics), load sharing (e.g., dynamic allocation among the BESS, FPGS, and power grid, and safety mechanisms such as ground fault detection, insulation monitoring, and emergency shutdown.

Battery Energy Storage System

Figure 5:
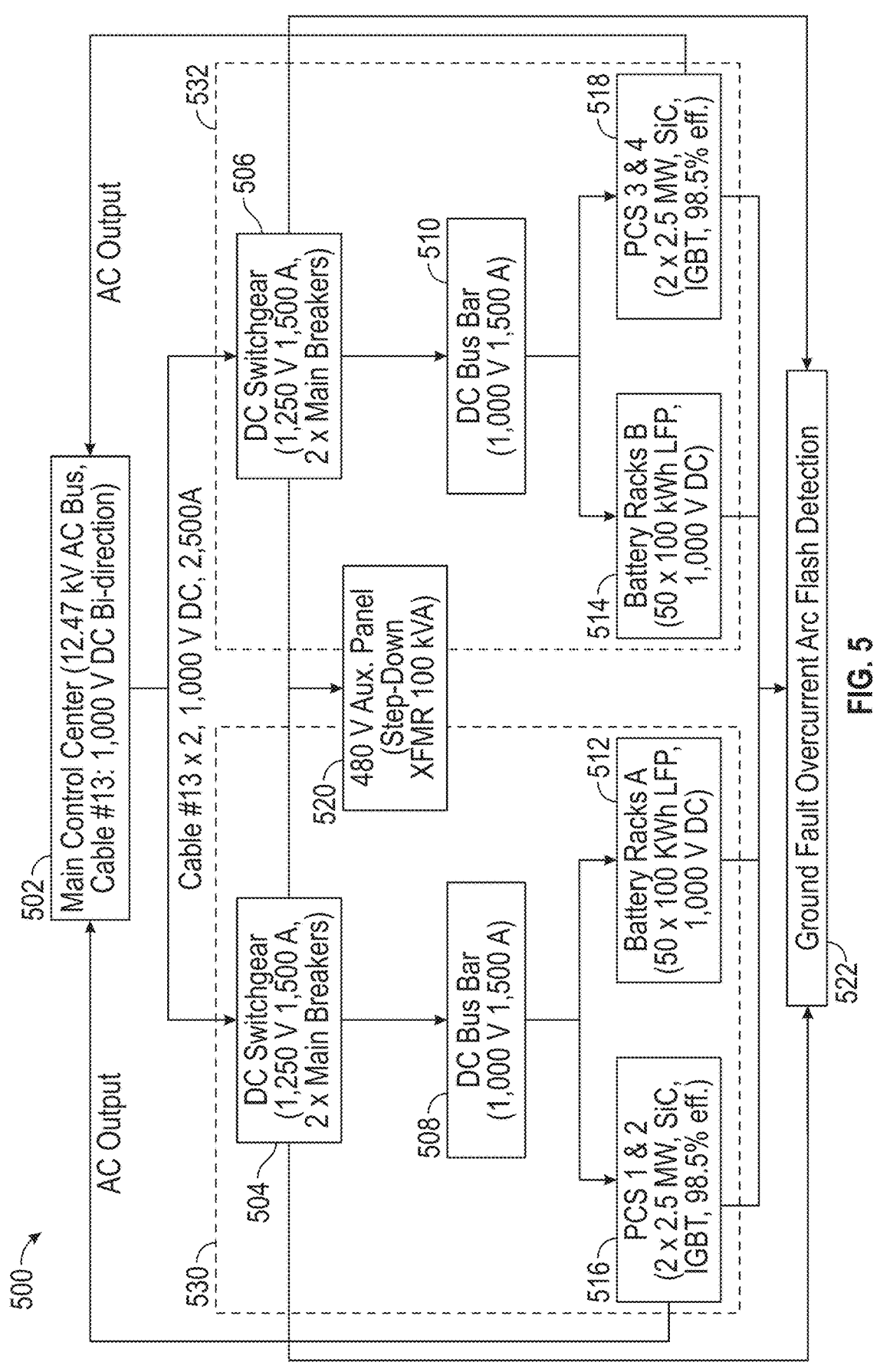
FIG. 5 is an exemplary electrical Single-Line Diagram (SLD) for the BESS of the AHDER system of FIG. 1, according to an embodiment of the disclosure.

FIG. 5 illustrates an example of an electrical single-line diagram (SLD) for a 10 MWh LFP BESS 500 (i.e., BESS 4 of FIG. 1). The exemplary SLD for the 10 MWh LFP BESS 500 illustrates a dual-container, fully redundant topology with two 5 MWh halves connected in parallel to the Main Control Center 502 via a cable (e.g., electric cable 13 of FIG. 1). The cable can be a 1,000 V DC, 2,500 A bi-directional cable.

Each container 530, 532 can feature a 1,250 V DC switchgear 504, 506 with dual main breakers, each feeding a corresponding 1,000 V copper DC bus bar 508, 510. Each of the DC bus bars 508, 510 links a 50×100 kWh LFP battery rack 512, 514 to a 2.5 MW SiC IGBT bidirectional Power Conversion System (PCS) inverter 516, 518 (98.5% efficiency), enabling ±2.5 MW charge/discharge per container 530, 532. A 100 kVA 480V auxiliary transformer 520 powers HVAC, lighting, and controls, while ground fault, overcurrent, and arc flash detection 522 ensure Institute of Electrical and Electronics Engineers (IEEE) 1547 and National Fire Protection Association (NFPA) 70E compliance.

The N+1 PCS design allows one unit to fail without losing capacity. Fiber-optic GOOSE messaging can provide sub-cycle fault isolation, guaranteeing 99.999% availability and seamless integration with the AHDER system for peak shaving, fast-charging support, and islanding for substantial durations (e.g., 4 hours).

In various embodiments, the BESS 500 can, for example, be a lithium-ion battery or other rechargeable battery systems with the following exemplary properties: 0.1~20 MWh (modular) capacity, 0.1~10 MW bidirectional power, a charging rate of up to 4 C discharge for fast charging support, a cycle life of 3000~6,000 cycles or more at 80% DoD, and capable of supporting V2G, firm frequency response (FFR), and synthetic inertia.

Emission Control System

Figure 6:
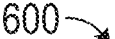
FIG. 6 illustrates the exemplary components of the Emission Control System ($NO_x$) of the AHDER system of FIG. 1, according to an embodiment of the disclosure.
Figure 6:
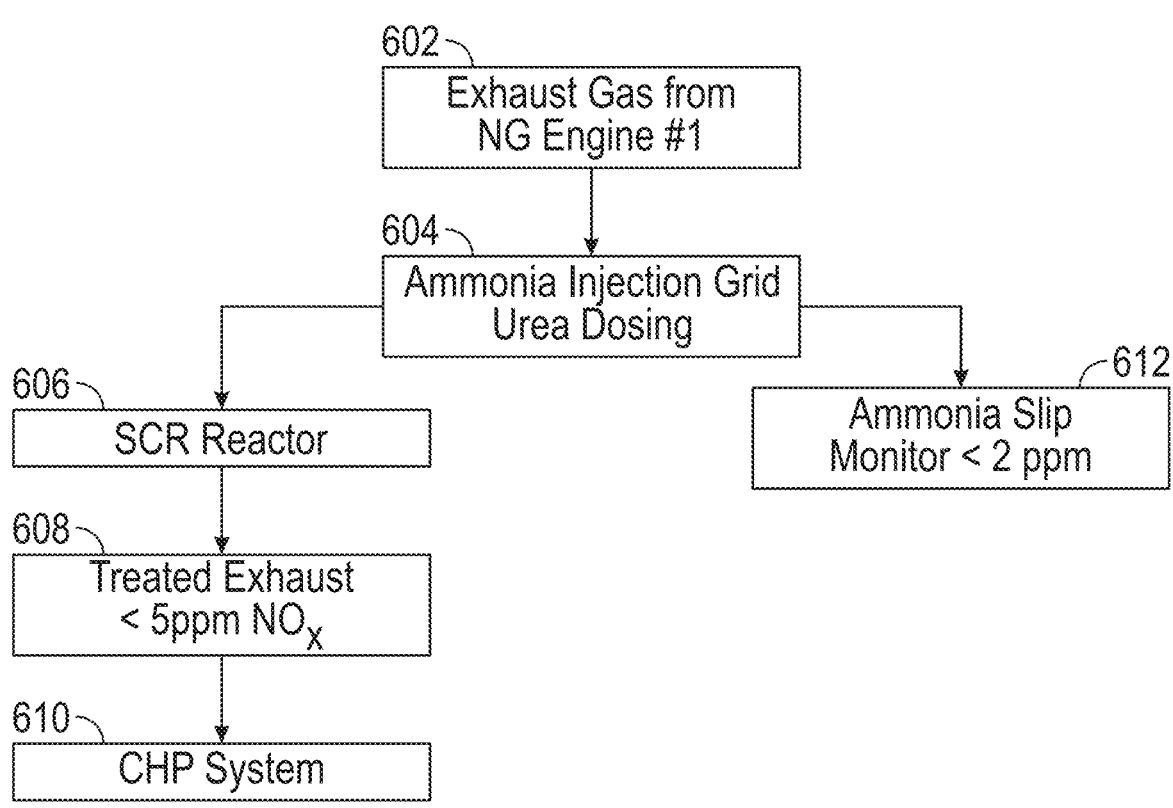

FIG. 6 illustrates the exemplary components of the Emission Control System 5 of the AHDER system 100 of FIG. 1. In this embodiment, the Emission Control System (ECS) 600 uses selective catalytic reduction (SCR) with urea dosing and catalyst monitoring to reduce nitrogen oxides ($NO_x$) emissions from the 10 MW fuel generator exhaust to less than 5 ppm, achieving a greater than 90% reduction efficiency in compliance with local air control regulations.

As illustrated in FIG. 6, hot exhaust 602 from the FPGS (not shown in FIG. 6) at 400-500° C. enters the ammonia injection grid 604, where urea or ammonia is precisely dosed and vaporized, then flows through a catalyst bed inside the SCR Reactor 606 operating at 300~400° C. to convert $NO_x$ into nitrogen and water via the reaction $4NO+4NH_3+O_2+4N_2+6H_2O$. Continuous Emissions Monitoring System (CEMS) sensors 612 track $NO_x$, $NH_3$ slip (<2 ppm), and temperature in real time, with auxiliary power drawn from the MCC 2 via electric cable 16 (shown in FIG. 1) for fans, pumps, and controls. The treated exhaust 608 exits at 280-320° C., delivering high-grade heat to the CHP subsystem 610 (i.e., CHP 6 of FIG. 1) for additional power and energy, ensuring near-zero emissions and seamless integration into the AHDER's 75% efficient microgrid.

Various embodiments of the ECS 600 can reduce emissions to meet the requirements of all air quality regulations. The emissions may include, but are not limited to, $NO_x$, $SO_x$, and CO. For instance, the ECS 600 can effectively reduce $NO_x$ level to 2~9 ppm or less (corrected to 15% $O_2$), CO and other VOCs by using, for example, selective Catalytic Reduction (SCR) with aqueous urea (DEF), an oxidation catalyst for CO and VOC reduction.

Combined Heat and Power System

Figure 7:
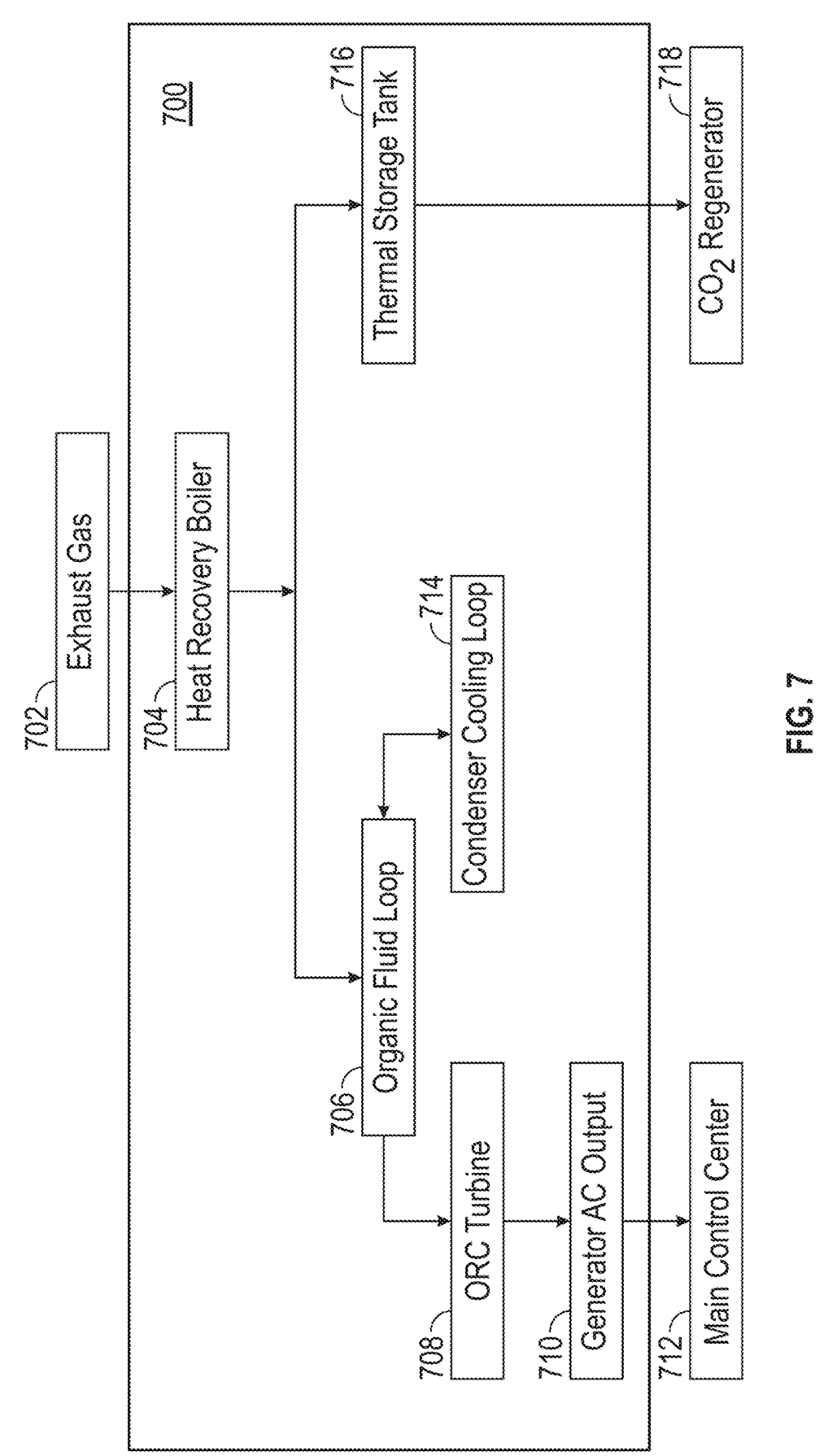
FIG. 7 illustrates the exemplary components of the Combined Heat and Power (CHP) System of the AHDER system of FIG. 1, according to an embodiment of the disclosure.

FIG. 7 illustrates the exemplary components of the CHP system of the AHDER system of FIG. 1. In the illustrated embodiment, the CHP system 700 uses Organic Rankine Cycle (ORC) or steam turbine to capture waste heat from the fuel generator exhaust at 280~320° C., then converts it into additional AC electricity and thermal energy at 120° C., achieving a combined efficiency of 75% for the overall AHDER system.

Referring to FIG. 7, exhaust gas 702 (e.g., gas emitted by the Fuel Power Generator System 1 and processed by the Emission Control System 5 in FIG. 1) enters a high-temperature heat recovery boiler 704, transferring heat to an organic working fluid loop 706, which vaporizes and expands through the ORC turbine 708 to drive a synchronous generator 710 outputting high voltage AC. The high voltage AC is stepped up and fed to the Main Control Center 712 (MCC 2 via electric cable 20, as shown in FIG. 1). The condensed fluid is recirculated in a closed loop 714.

Hot water from the heat recovery boiler 704 is stored in a thermal tank 716 and supplied to the $CO_2$ regenerator 718 (i.e., Capture System 7 via thermal line 21 of FIG. 1) for amine regeneration, thereby reducing the capture energy penalty by 25%. In this embodiment, parasitic load can power circulation pumps and controls, with liquid-cooled condensers rejecting residual heat to the cooling loop, ensuring 99.9% availability, modular maintenance, and seamless integration with the AHDER system for enhanced efficiency and sustainability.

The CHP system 700 recovers high-grade exhaust heat and jacket water heat to 1) generate secondary electricity via ORC or steam turbine, 2) supply thermal energy to the $CO_2$ Capture System 718, and 3) provide district heating/cooling if needed. The total efficiency of the CHP system 700 can be 70-80% (electrical+thermal) or higher.

$CO_2$ Capture System

Figure 8:
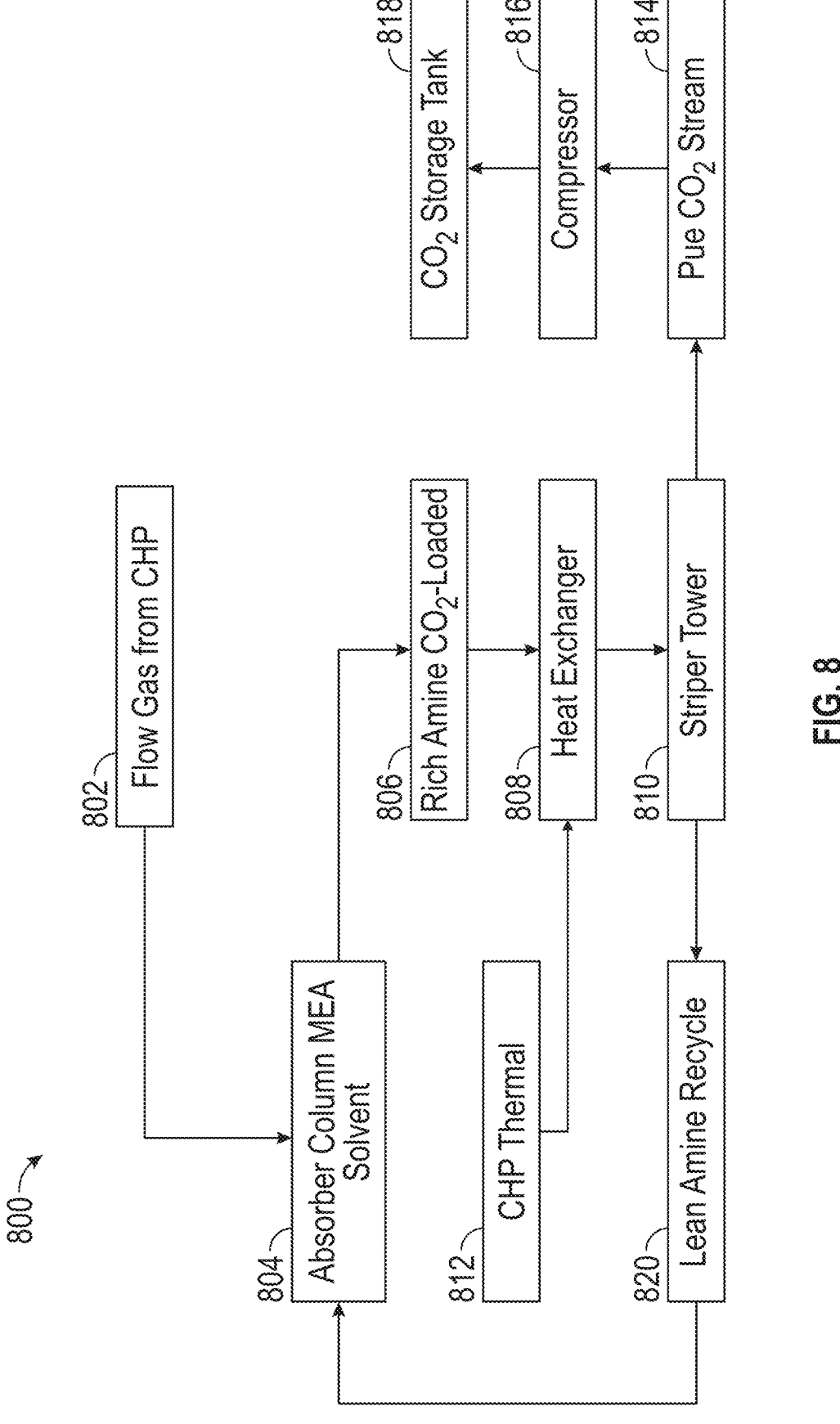
FIG. 8 illustrates the exemplary components of the $CO_2$ Capture System of the AHDER system of FIG. 1, according to an embodiment of the disclosure.

FIG. 8 illustrates the exemplary components of the $CO_2$ Capture System 800 of the AHDER system of FIG. 1. The $CO_2$ Capture System 800 uses amine-based absorption and thermal regeneration driven by the CHP waste heat. The $CO_2$ Capture Subsystem 800 employs post-combustion amine absorption to capture 90% of $CO_2$ emissions from the FPGS exhaust, producing food-grade $CO_2$ for industrial sale and Low Carbon Fuel Standard (LCFS) carbon credits at, for example, $50/ton.

In operation, flue gas 802 at 280-320° C. from the SCR enters a packed absorber column where it contacts mono-ethanolamine (MEA) solvent 804, chemically binding $CO_2$. The $CO_2$-rich amine 806 is pumped to a stripper tower 810 heated by the steam 808 from the CHP subsystem 812 at 120° C., releasing 99.9% pure $CO_2$ steam 814 for compression to 150 bar via a multi-stage compressor 816 and storage in $CO_2$ storage tank 818. Lean amine 820 is cooled and recirculated, with heat exchangers 808 and solvent filtration minimizing degradation. The system can integrate with the Main Control Center (not shown in FIG. 8) via Modbus TCP for real-time flow control, operate with less than 1% down-time, and reduce the AHDER's carbon footprint to near-zero.

The $CO_2$ Capture System 800 can capture greater than 90% of $CO_2$ from exhaust stream using, for example, amine-based chemical absorption such as (e.g., MEA, MDEA) or membrane separation.

For example, in some embodiments, the $CO_2$ Capture System can achieve the following results:
Capture Rate: 1~10 tons $CO_2$/day per MW
Purity: >99.9% (food-grade or industrial)
Regeneration: Driven by CHP waste heat→zero parasitic electrical load
Output: Liquid $CO_2$ for sale (beverage, refrigeration, EOR) or sequestration
Carbon Credit Eligible: Verifiable under LCFS, Section 45Q, or VERRA Table 2 below lists the various operation modes of the AHDER system of FIG. 1, according to the embodiments of the disclosure.

TABLE 2

| Mode | Description |
|---|---|
| Grid-Tied (Normal) | FPGS + CHP + BESS + Grid supply load; excess power exported |
| Peak Shaving | BESS discharges during high time-of-use (TOU) rates |
| Islanded (Off-Grid) | FPGS + CHP + BESS only; MCC manages load shedding |
| Fast-Charge Priority | All available power routed to FCS; non-essential loads curtailed |
| Black Start | BESS initiates generator startup |
| $CO_2$ Maximization | CHP thermal output prioritized to $CO_2$ regeneration |
| Export Maximization | Ramping generator and CHP exporting to electric grid |
| General-Purpose Outlet | Remaining power routed to power outlet; non-essential loads curtailed |
| Maintenance | Reducing load to 20% while cycling subsystems for safe servicing |

The operation modes table (Table 2) encapsulates the unparalleled operational versatility of the disclosed embodiments, enabling instantaneous, MCC-driven switching among six intelligently layered modes to maximize uptime, minimize costs, and monetize emissions.

In Grid-Tied (Normal) mode, the FPGS, CHP and BESS synergize with the power grid to export excess while importing off-peak. Peak Shaving mode unleashes BESS discharge to evade high TOU tariffs. Islanded mode (Off-Grid) relies solely on FPGS, CHP, and BESS with MCC load shedding for remote resilience. Fast-Charge Priority mode channels all power to the MW-level DC ports of the FCS, curtailing peripherals for heavy-duty EV fleets. Black Start mode empowers BESS to ignite the generator during blackouts. $CO_2$ Maximization mode reallocates CHP thermal output to regenerate absorbents, producing greater than 99.9% pure liquid $CO_2$ for industrial sale and carbon credits transforming exhaust into a profit center at greater than 70% efficiency. Export Maximization mode exports most of the power from the generator and CHP to electric grid. General-purpose outlet mode provides remaining power to power outlet for non-essential loads curtailed. Maintenance mode reduces load to 20% while cycling subsystems for safe servicing.

This hardware-orchestrated, multi-revenue modality, verifiable through real-time SCADA and CEMS, can deliver autonomous, verifiable net-zero performance in ports, mining camps, or disaster zones, eclipsing prior art's simulated, fragmented, or non-monetized approaches with a closed-loop emissions-to-revenue ecosystem that cannot be accomplished using any existing systems or methods.

Exemplary Embodiment 1

Referring again to FIG. 1, in one embodiment of the disclosure, the AHDER system 100 is configured for a 10 MW nominal capacity, integrating FPGS 1, i.e., an alternative fuel power generation subsystem such as RNG/NG reciprocating engines) a battery energy storage subsystem (BESS 4, 10 MWh), a combined heat and power (CHP 6) subsystem, a $NO_x$ control subsystem (ECS 5), and a $CO_2$ capture subsystem 7, all coordinated by a main control subsystem (MCC 2).

In this embodiment, power balance is maintained in real-time by the MCC 2, which dynamically allocates electrical output from the FPGS 1 (up to 10 MW at 42% electrical efficiency) and CHP subsystem 6 (up to 3 MW additional AC power recovered from waste heat via an Organic Rankine Cycle) to meet loads, including fast-charging (up to 10 MW DC for electric ground support equipment (GSE)), and subsystems (3.1 MW), while enabling bi-directional grid exchange (e.g., with power grid 8) (+10 MW) and BESS charge/discharge (+2.5 MW). For instance, at peak demand, the subsystem prioritizes BESS discharge to supplement generator output by the FPGS 1, ensuring P_supply=P_load±0.1% (where P_supply includes FPGS 1, CHP 6, BESS_out 4, and power grid 8; P_load includes the power used for fast charging, the power used for operation of all subsystems, the power charged back to the BESS subsystem and the power exported to electric grid and power outlet).

In this embodiment, energy balance is optimized over 15-minute intervals using an AI-driven energy management system (i.e., the EMS of MCC 2), tracking cumulative input from fuel (1.536 million scf/day RNG/NG, equivalent to 450,000 kWh thermal) against outputs: 192,000 kWh/day net electric (at 80% capacity factor) delivered to charging (100,000 kWh/day) and export (56,000 kWh/day), with BESS throughput (30,000 kWh charged, 27,000 kWh discharged at 90% round-trip efficiency) providing arbitrage. The balance equation E_in=E_out+ΔE_BESS ensures no energy deficit, with excess stored or exported to minimize costs.

Thermal balance leverages CHP 6 to recover 18.6 MW waste heat from the ECS (280~320° C. inlet), yielding 7.6 MW usable thermal energy (120° C. steam/hot water) primarily directed to $CO_2$ capture regeneration via insulated thermal line 21, satisfying the amine reboiler demand (~430 MMBtu/day) and reducing the capture energy penalty by 25%. The balance Q_CHP=Q_CO2+ΔQ_buffer modulates a proportional valve to maintain buffer tank levels (500 m$^3$), enabling 75% total system efficiency (42% electric+33% thermal) while minimizing vented heat (<100° C. stack). This integrated balancing power for instantaneous stability, energy for daily optimization, and thermal for emission processes, distinguishes the AHDER system 100 from conventional DERs, enabling near-zero emissions and scalable deployment in constrained environments like airports.

Exemplary Embodiment 2

In another embodiment of the invention, the AHDER system 100 is scaled to a 1 MW nominal capacity for compact applications, such as remote charging hubs or small-scale airport GSE support, comprising a single RNG/NG reciprocating engine generator (FPGS 1), a 1 MWh BESS 4, a proportional CHP unit 6, $NO_x$ control via SCR (ECS 5), and a modular $CO_2$ capture system 7, all orchestrated by the main control subsystem (MCC 2). Power balance can be achieved instantaneously through the control subsystem's AI-driven dispatcher (EMS), allocating output from the generator 1 (up to 1 MW at 42% efficiency) and CHP 6 (up to 0.3 MW additional AC from waste heat) to loads including fast-charging (up to 1 MW DC for heavy-duty EVs), and sub-systems (0.31 MW), with BESS 4 providing ±0.25 MW for peak shaving and grid exchange (+1 MW). For example, during high-demand EV charging, the subsystem (MCC 2) commands BESS 4 discharge to augment generator power, maintaining P_supply=P_load+ 0.1% (P_supply=generator 1+CHP 6+BESS 4_out+power grid 8; P_load includes the power used for fast charging, the power used for operation of all subsystems, the power charged back to BESS subsystem, and the power exported to electric grid and power outlet).

In this embodiment, energy balance can be managed over 15-minute horizons by an embedded optimizer, reconciling fuel input (153,600 scf/day RNG/NG, ~45,000 kWh thermal) with outputs: 19,200 kWh/day net electric (at 80% capacity factor) directed to charging (10,000 kWh/day) and export (5,600 kWh/day), while BESS cycles 3,000 kWh charged and 2,700 kWh discharged (90% round-trip efficiency) for off-peak storage. The equation E_in=E_out+ ΔE_BESS prevents deficits, enabling cost arbitrage against variable grid rates.

Thermal balance can utilize CHP 6 to harvest 1.86 MW waste heat from ECS (280~320° C.), delivering 0.76 MW thermal energy (120° C.) chiefly to $CO_2$ capture regeneration via line 21, fulfilling the amine reboiler (~43 MMBtu/day) and slashing capture penalty by 25%. Governed by Q_CHP=Q_$CO_2$+ΔQ_buffer, a smart valve sustains a 50 m$^3$ thermal tank, yielding 75% total efficiency (42% electric+ 33% thermal) and minimizing stack losses (<100° C.). This synergistic balancing power for stability, energy for sustainability, and thermal for decarbonization, enables the 1 MW AHDER system 1 to deliver scalable, near-zero-emission power in space-constrained settings, outperforming stand-alone renewables or fossil systems.

Various embodiment of the AHDER system disclosed above harmonize low land use with high dispatchability (fuel-flexible RNG/NG operation unaffected by weather), near-zero emissions (via integrated SCR for $NO_x$ level of 2~9 ppm or less and greater than 90% $CO_2$ capture yielding salable liquid product), and unparalleled 70-80% total efficiency through CHP waste heat recovery (far eclipsing the 15-20% of solar+battery systems (plagued by intermittency and vast spatial demands) and the 35% of diesel generators (beset by high pollution and fuel logistics)). While conventional solar+battery setups remain grid-dependent for fast charging and offer no $CO_2$ monetization, and diesel provides no charging or revenue from emissions, the disclosed embodiments can deliver MW-level DC fast charging for heavy-duty EVs, full off-grid capability with BESS black-start, and high revenue streams from power sales, industrial-grade $CO_2$ liquefaction, and carbon credits, all of which render them the definitive, deployable bridge to net-zero electrification in, for example, ports, remote sites, and strained grids, where existing technologies falter in scalability, sustainability, or economic viability.

The various modules of the AHDER system of FIGS. 1-8 can be implemented in hardware, software, firmware, or a combination of any of the above. If implemented in software, the modules can be stored in computer storage that may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An advanced hybrid distributed energy resource (AHDER) system comprising:
   - a fuel power generator system (FPGS) configured to utilize alternative fuel to produce electricity;
   - a main control center (MCC) electrically coupled to the FPGS and an electric power grid, the MCC configured to import power from and export power to the electric power grid;
   - a battery energy storage system (BESS) electrically coupled to the MCC and configured to store excess energy and provide electric power;
   - a fast-charging system (FCS) electrically coupled to the MCC and configured to receive AC power from the MCC and convert the AC power to DC power for charging electric equipment;
   - an emission control subsystem (ECS) fluidly coupled to an exhaust outlet of the FPGS and configured to reduce pollutants emitted by the FPGS;
   - a combined heat and power (CHP) system electrically coupled to the MCC and thermally and electrically coupled to the ECS, the CHP system configured to recover waste heat from an emission of the FPGS for generating electricity and thermal energy; and
   - a $CO_2$ capture system configured to receive thermal energy from the CHP system and treat exhaust from the ECS for producing liquid $CO_2$.

2. The AHDER system of claim 1, wherein the FPGS comprises one or more reciprocating engines or microturbines with fuel-flexible intake capable of switching between at least two types of hydrocarbon-based fuels.

3. The AHDER system of claim 1, wherein the MCC comprises an energy management system (EMS) configured to provide real-time optimization of fuel consumption, a state-of-charge of the BESS, thermal energy distribution, and charging demand of the AHDER.

4. The AHDER system of claim 3, wherein the EMS is configured to select an operation mode of the AHDER system from a plurality of operation modes comprising:
   - a. Normal Mode, in which the EMS simultaneously dispatching the FPGS, the CHP, and the BESS while importing power from and exporting power to the electric power grid;
   - b. Peak Shaving Mode, in which the EMS discharges the BESS within its 80%~90% state of charge (SOC) to cap grid import below Time-of-Use (TOU) thresholds;
   - c. Off-Grid Mode, in which the EMS isolates the AHDER from the electric power grid and sustains fast-charging and $CO_2$ capture using only the FPGS, the CHP, and the BESS;
   - d. Fast-Charge Priority Mode, in which the EMS allocates at least 90% of available power to the FCS while curtailing non-essential loads;
   - e. Black Start Mode, in which the EMS initializes the FPGS using the BESS without using power from the electric power grid;
   - f. $CO_2$ Maximization Mode, in which the EMS diverts 100% of thermal output from the CHP system to the $CO_2$ Capture System for high pressure or liquid $CO_2$ production;
   - g. Export Maximization Mode, in which the EMS ramps the FPGS and CHP system power exporting via a power outlet of the MCC;
   - h. General-Purpose Outlet Mode, in which the MCC provides remaining power to the power outlet for non-essential loads curtailed; and i. Maintenance Mode, in which the EMS reduces load of the AHDER system to 20% while cycling one or more of the FPGS, the ECS, the CHP system, the $CO_2$ Capture System, the BESS, and the FCS for safe servicing.

5. The AHDER system of claim 4, wherein, when in the Normal Mode, the EMS automatically balances, within ±0.1% in real time, P_supply=P_generator+P_CHP+P_BESS_out+P_grid against P_charging+P_sub+P_BESS_in+P_export within ±0.1% in real time, wherein P_supply is an overall power supply of the AHDER system, P_generator is a power output of the FPGS, P_CHP is a power output of the CHP system, P_BESS_out is a power output of the BESS, P_grid is a power output of the electric power grid, P_charging is an amount of power consumed by electric equipment charging from the FCS, P_sub is an amount of all power consumed by the operation of the FPGS, the MCC, the BESS, the FCS, the ECS, the CHP system, and the $CO_2$ capture system, P_BESS_in is the power charged back to BESS subsystem and P_export is an amount of power exported to the electric power grid and the power outlet.

6. The AHDER system of claim 4, wherein, when in the Peak Shaving Mode, the EMS executes a pre-programmed 15-minute forecast to discharge the BESS within its 80%~90% SOC.

7. The AHDER system of claim 4, wherein, when in the Off-Grid Mode, the EMS sheds non-critical loads within 50 ms while sustaining both fast-charging provided by the FCS and $CO_2$ capturing by the $CO_2$ capture system.

8. The AHDER system of claim 4, wherein, when in the Fast-Charge Priority Mode, the EMS dynamically limits $CO_2$ capture parasitic load to redirect power to the FCS for simultaneous charging of a plurality of electric equipment.

9. The AHDER system of claim 4, wherein, when in the Black Start Mode, the EMS uses the BESS to spin the FPGS from 0 to 1 MW in less than 90 seconds.

10. The AHDER system of claim 4, wherein, when in the $CO_2$ Maximization Mode, the EMS opens a thermal valve to 100% to boost $CO_2$ regeneration and yield $CO_2$ products.

11. The AHDER system of claim 4, wherein, when in the Export Maximization Mode, the EMS synchronizes the FPGS and the CHP to deliver maximum power to the electric power grid.

12. The AHDER system of claim 4, when in the Maintenance Mode, the EMS reduces fuel flow to the FPGS to 20%, cycles selective catalytic reduction (SCR) catalyst heaters of the ECS, and logs all temperatures for predictive analytics.

13. The AHDER system of claim 1, wherein the FCS is configured to deliver 0.5~1,000 MW of DC power at 400-1500 V and support a plurality of charging protocols; and wherein the FCS is further configured to perform ground fault detection and emergency shutdown.

14. The AHDER system of claim 1, wherein the BESS has a capacity of 0.5~2,000 MWh and is configured to perform peak shaving, frequency regulation, synthetic inertia, and black start capability, with a minimum cycle life of 3,000~6,000 cycles at 80% depth of discharge.

15. The AHDER system of claim 1, wherein the ECS is configured to employ selective catalytic reduction (SCR) with urea or ammonia injection to reduce $NO_x$ level to 2~9 ppm or less.

16. The AHDER system of claim 15, wherein the ECS comprises oxidation catalysts for reducing $SO_x$, CO, VOCs, or particulate matter.

17. The AHDER system of claim 1, wherein the CHP system is configured to recover waste heat from an exhaust and jacket water of the FPGS to generate electricity and supply thermal energy to the $CO_2$ capture system.

18. The AHDER system of claim 17, wherein the CHP system is configured to generate the electricity via an Organic Rankine Cycle (ORC) or steam turbine.

19. The AHDER system of claim 1, wherein the $CO_2$ capture system uses amine-based chemical absorption to capture greater than 90% of $CO_2$, with regeneration driven by thermal energy from the CHP subsystem, producing liquid $CO_2$ with greater than 99.9% purity.

20. The AHDER system of claim 1, wherein the alternative fuel comprises one of hydrocarbon-based fuels comprising natural gas, renewable natural gas, methane, ethane, propane, and syngas.

\* \* \* \* \*